(12) United States Patent
Wedeck et al.

(10) Patent No.: US 7,163,289 B2
(45) Date of Patent: Jan. 16, 2007

(54) EYEGLASS FRAME ADAPTED FOR THE REMOVAL AND INSERTION OF LENSES

(75) Inventors: David Wedeck, Teaneck, NJ (US); Robert White, Midland Park, NJ (US); Russell LaCasse, Southbridge, MA (US)

(73) Assignee: Transframe Limited Liability Company, West Englewood, NJ (US)

( * ) Notice: Subject to any disclaimer, the term of this patent is extended or adjusted under 35 U.S.C. 154(b) by 0 days.

(21) Appl. No.: 10/544,692

(22) PCT Filed: Feb. 3, 2005

(86) PCT No.: PCT/US2005/003276

§ 371 (c)(1),
(2), (4) Date: Aug. 5, 2005

(87) PCT Pub. No.: WO2006/083247

PCT Pub. Date: Aug. 10, 2006

(65) Prior Publication Data

US 2006/0262269 A1    Nov. 23, 2006

(51) Int. Cl.
    *G02C 1/08*    (2006.01)
(52) U.S. Cl. .................. 351/92; 351/95; 351/97
(58) Field of Classification Search .......... 351/41, 351/90–102
    See application file for complete search history.

(56) References Cited

U.S. PATENT DOCUMENTS 2,754,724 A * 7/1956 Fishman ............... 351/97
6,273,564 B1 * 8/2001 Wedeck et al. ......... 351/92

\* cited by examiner

*Primary Examiner*—Huy Mai
(74) *Attorney, Agent, or Firm*—Richard B. Klar; Law Office of Richard B. Klar

(57) ABSTRACT

This invention provides for making a cam arm with a wave-shaped or curved portion adapted to fit within a recess on the top of the upper closure block of the frame so that the frame eyewire is securely closed in place.

4 Claims, 5 Drawing Sheets

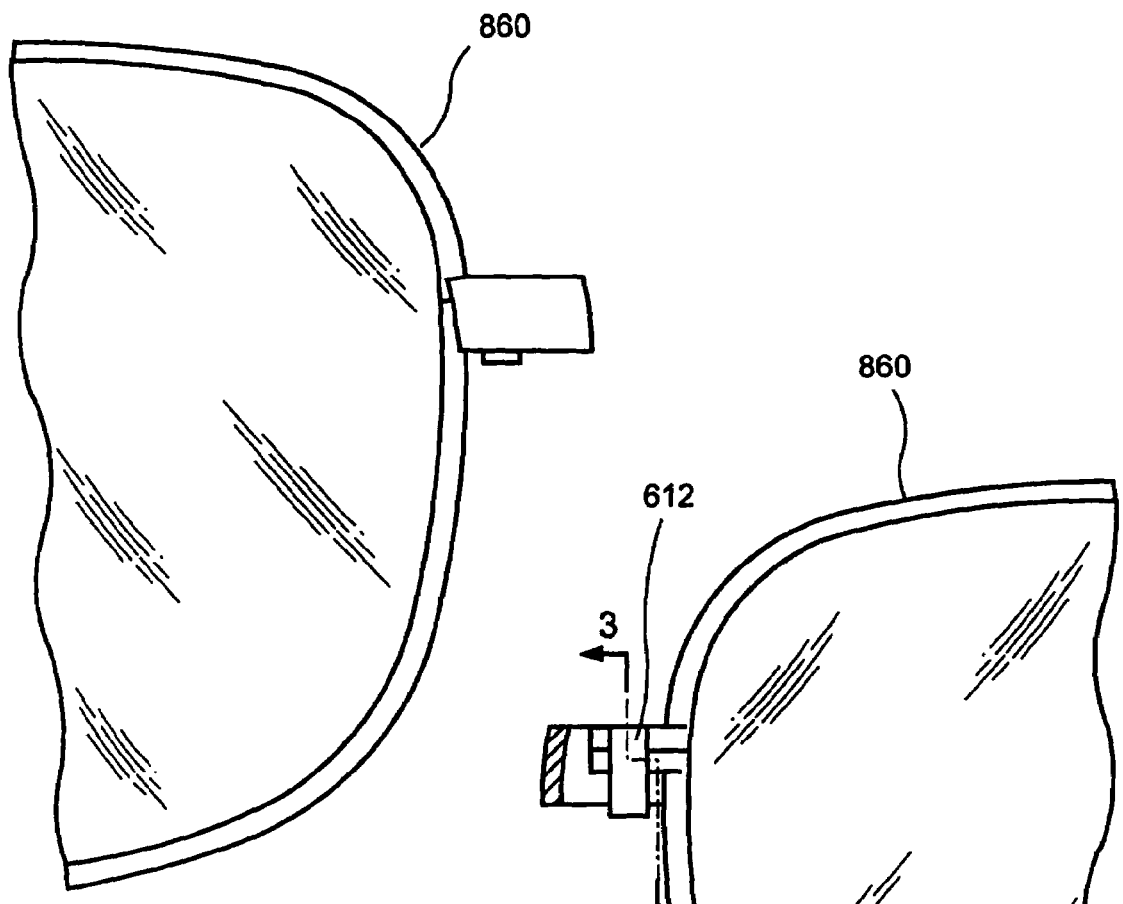
FIG. 1
FIG. 2
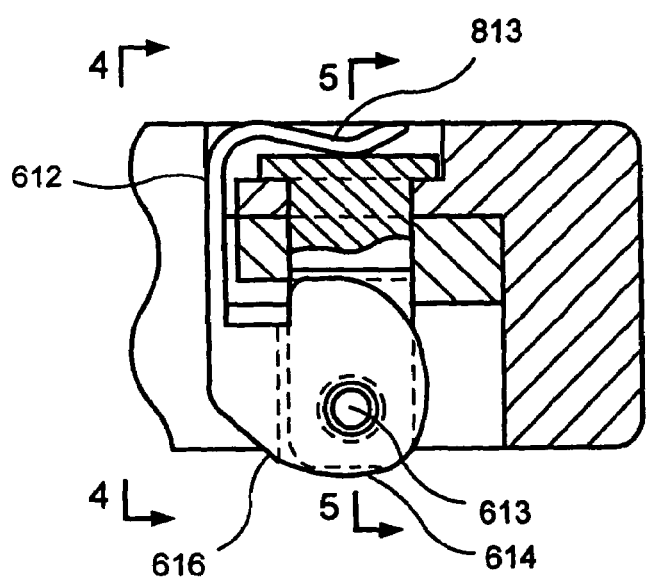
FIG. 3

EYEGLASS FRAME ADAPTED FOR THE REMOVAL AND INSERTION OF LENSES

BACKGROUND OF THE INVENTION

1. Field of the Invention

The present invention relates to an important improvement on an eyeglass frame in which a latching mechanism is applied to the eyewire portion of the frame to permit the insertion, removal or replacement of the lenses in the frame. In particular, the present invention provides a much more secure closure to retain the lenses in the frame, allows slightly over cut lenses to be inserted and retained, and closes in such a way that the frame will not accidentally open.

2. The Related Prior Art

U.S. Pat. No. 6,273,564 describes an eyeglass frame for the removal and insertion of lenses that provides for a portion of the frame removably coupled to the body of the frame to permit the insertion, removal or replacement of the lenses in the frame. It would be most desirable to provide for a secure closure of the frame eyewire so that the frame portion which could be opened is able to accept lenses that have been cut slightly over-size, retain the lenses securely, prevent accidental release, yet still be able to be easily opened with readily available tools. The present invention provides for such a feature.

SUMMARY OF THE INVENTION

The principal object of the present invention provides a modification of the design of U.S. Pat. No. 6,273,564 in which a more secure closure is provided that will accept oversized lenses and not accidentally open which could be integrated into the current design in the aforementioned patent.

This invention importantly provides for utilizing a cam arm made from a suitably elastic metal with a wave-shaped or curved portion adapted to fit on top of or within a recess on the top of the upper portion of the eyewire closure blocks so that the frame eyewire is securely closed in order to retain the lenses.

The wave shaped cam arm, when made with suitably elastic metal, can accept lenses that have been cut slightly over-size in terms of having a longer circumference than the inside of the eyewire. When closed, the cam arm will exert a constant force to hold the upper and lower closure blocks together, which provides for a more secure fit. The design will prevent accidental release, yet can be easily opened using readily available tools. In addition fewer parts are required, and standard manufacturing processes can be used.

BRIEF DESCRIPTION OF THE DRAWINGS

FIG. 1 shows a partial front view of the latching mechanism of the frame;

FIG. 2 shows a partial rear view of the latching mechanism of the partial sectional view in a closed position;

FIG. 3 shows a sectional view of the latching mechanism of the frame taken along the lines 3—3 of FIG. 2;

DETAILED DESCRIPTION OF THE PREFERRED EMBODIMENT(S)

Figure 4:
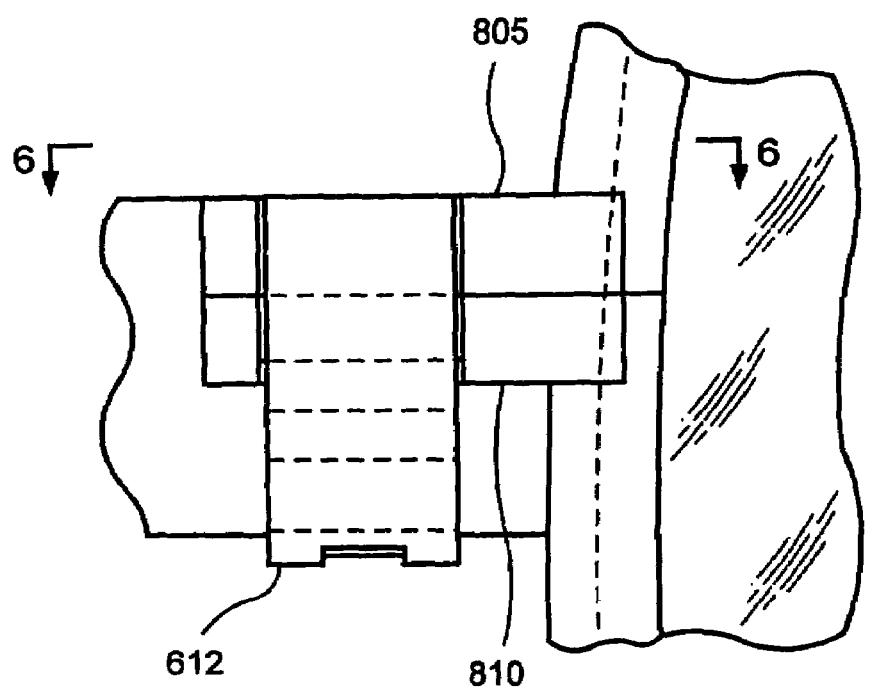
FIG. 4 shows an elevated rear view taken along lines 4—4 of FIG. 3 showing the cam arm is closed along with the closed upper and lower closure blocks of the frame.
Figure 5:
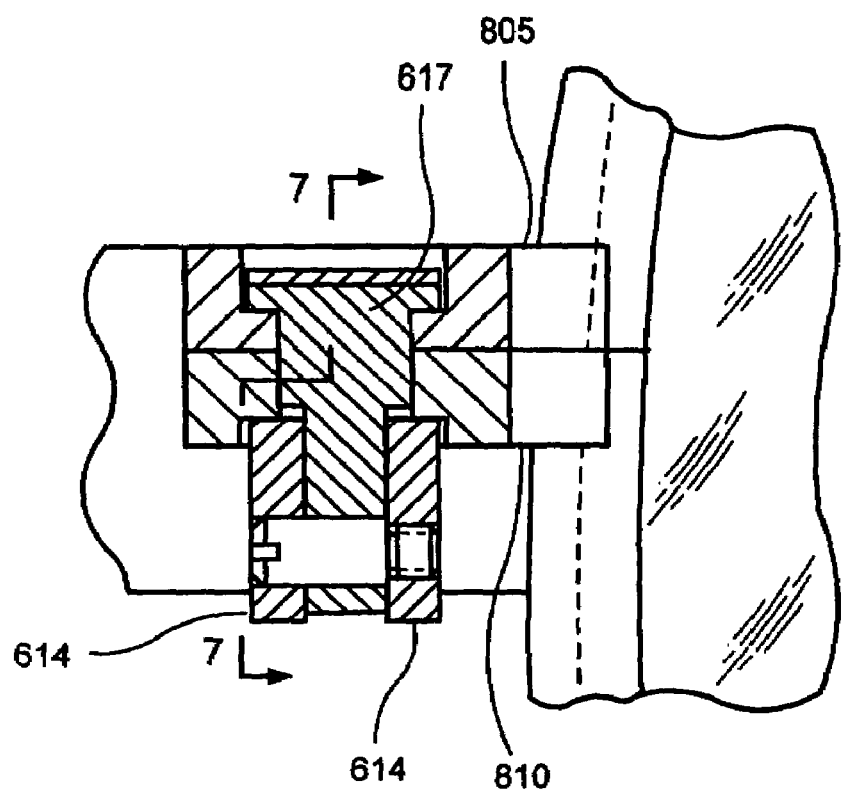
FIG. 5 is a sectional view taken along lines 5—5 of FIG. 3 showing the cam arm and hinge pin, and the recesses in the upper and lower closure blocks.
Figure 6:
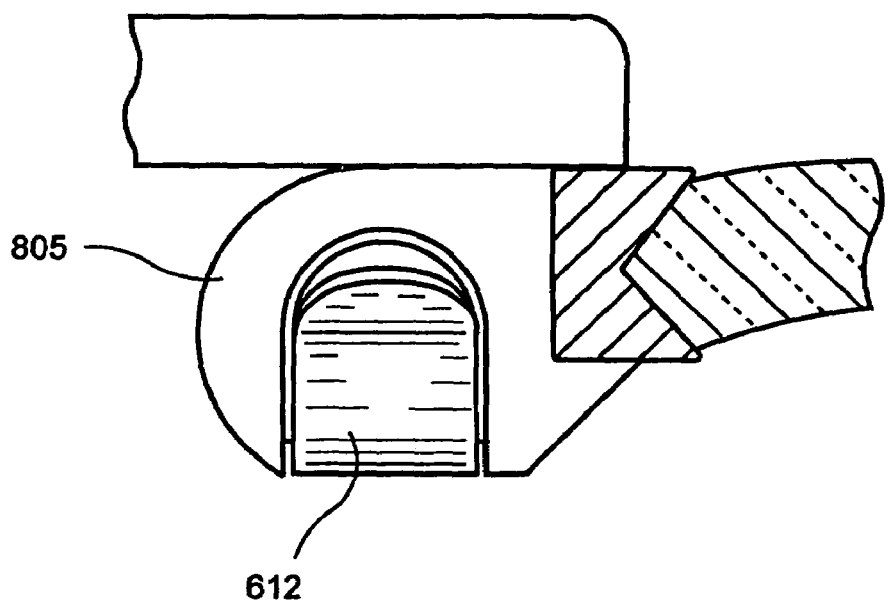
FIG. 6 shows a top view taken along lines 6—6 of FIG. 4 showing the frame in the closed position.

Referring to the drawings of FIGS. 1–11, the present invention provides a substantial modification to the design, in U.S. Pat. No. 6,273,564 which is incorporated herein by reference thereto.

Figure 7:
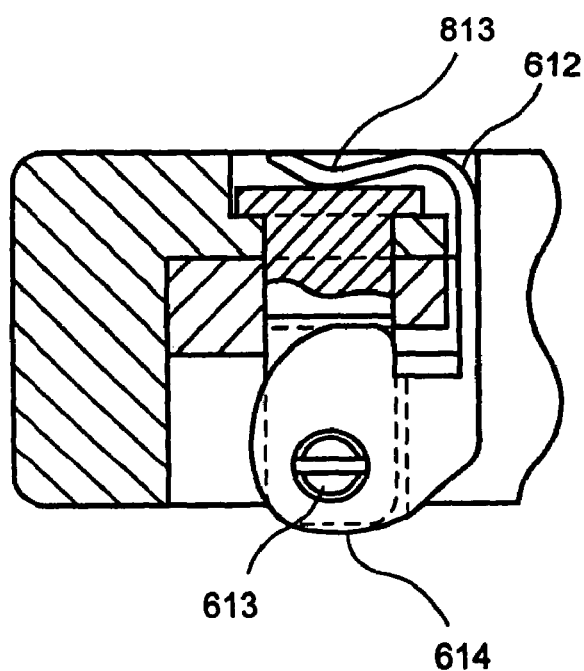
FIG. 7 is a sectional view taken along lines 7—7 of FIG. 5 of the latching mechanism of the frame shown from the opposite side of FIG. 3.

As shown in FIGS. 1–3, a latching cam lock 616 is provided for an eyeglass frame. The cam lock 616 has a top cam arm portion 813 that is curved or wave-shaped to fit into a recess in the top of the upper closure block 805. FIG. 7 shows the same view as FIG. 3 but from the other side.

The cam arm 612 is made of a suitable elastic material such as spring steel, the purpose of which is by providing a cam arm with the aforementioned wave-shaped portion and made of a suitable elastic material enables the cam arm 612 to latch even if the lens circumference is slightly larger than ideal. This enables the lenses to be over-cut up to 0.25 mm (or more) and still be able to (i) enable the cam arm 612 to close(see FIG. 4), even if the lenses are cut with a larger circumference than optimal; (ii) exert a load in order to keep the upper closure block 805 and lower closure block 810 (which corresponds roughly to elements 605 and 610 in U.S. Pat. No. 6,273,564) mated together; (iii) enable the cam lock to provide a more secure closure to prevent accidental opening; and (iv) enable the cam lock to be opened using readily available tools such as a small, slot-blade screwdriver.

The suitable elastic material for the cam arm 612 is strong enough to hold the cam arm 612 in place once it has been securely set, but enables some degree of give in the event that the lens is over-cut. Spring steel is a good material to use for this application, although other suitably elastic material can work. The elasticity in the cam arm 612 also provides for clamping force to keep the closure blocks 805, 812 securely together.

The hinge pin is a non-threaded pin 617 (see FIGS. 5, and 7) to eliminate the need for a threaded post. This enables a reduction in the overall height of the design, and insures proper alignment of the cam arm 612 and the groove cut into the back of the upper and lower closure blocks, 805 and 810, respectively.

By securing the cam arm into the recess on the top of the upper closure block 805 the cam arm is securely locked in place which ensures that the frame closure blocks are not accidentally opened which can cause the release of the lens. Instead the closure blocks are held together under load (see FIG. 3) thereby preventing the lenses from dropping out of the frame unintentionally.

Figure 8:
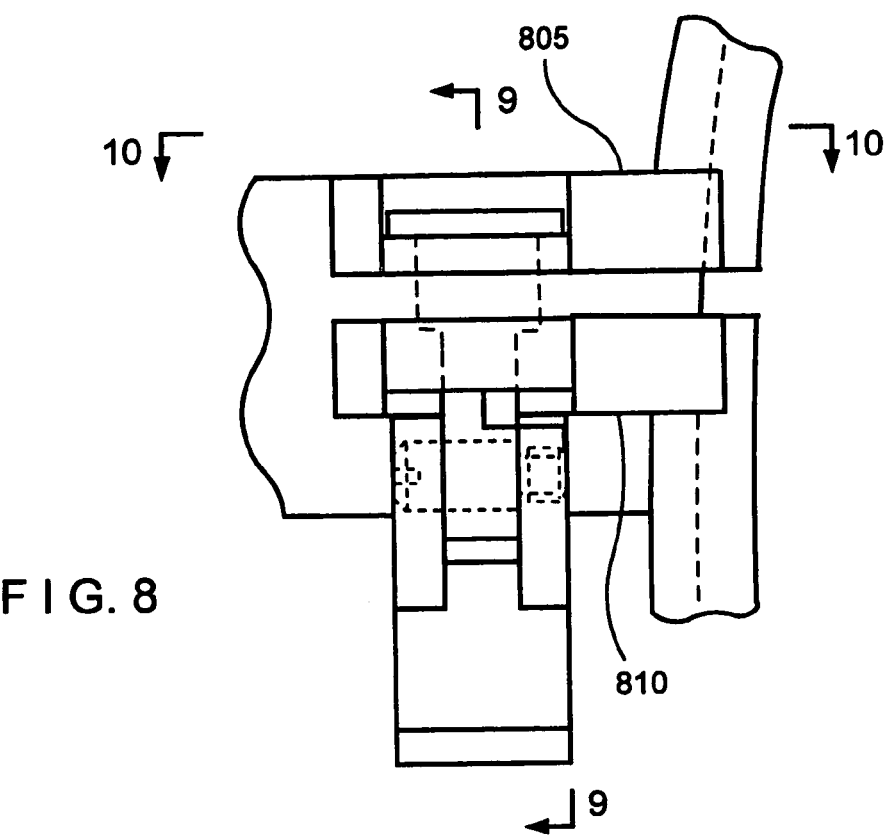
FIG. 8 is a rear view of the latching mechanism of the frame in an open position showing the gap created in the closure blocks and eyewire.
Figure 9:
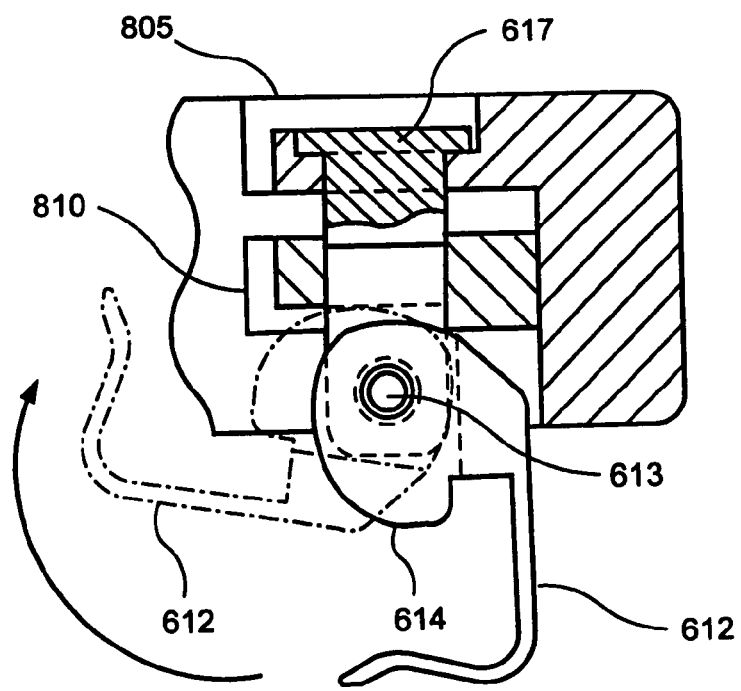
FIG. 9 is a sectional view along lines 9—9 of FIG. 8 in the open position.
Figure 10:
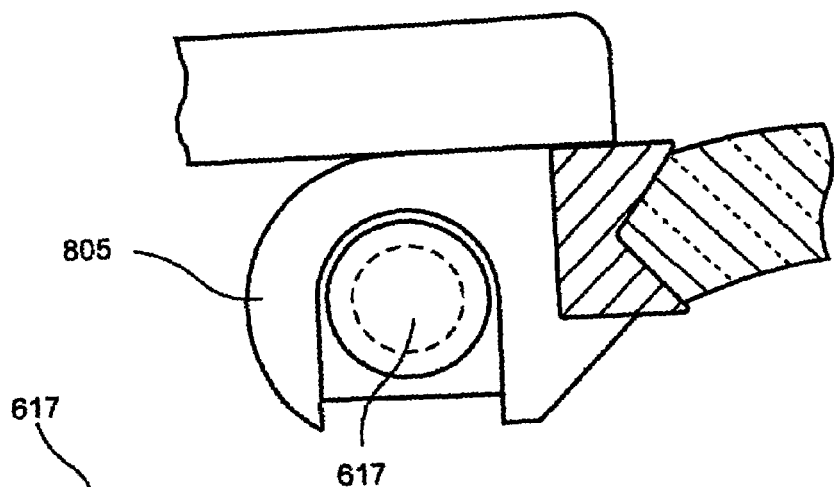
FIG. 10 is a top view along lines 10—10 of FIG. 8 in the open position showing the top of the hinge pin and the recess in the top closure block.
Figure 11:
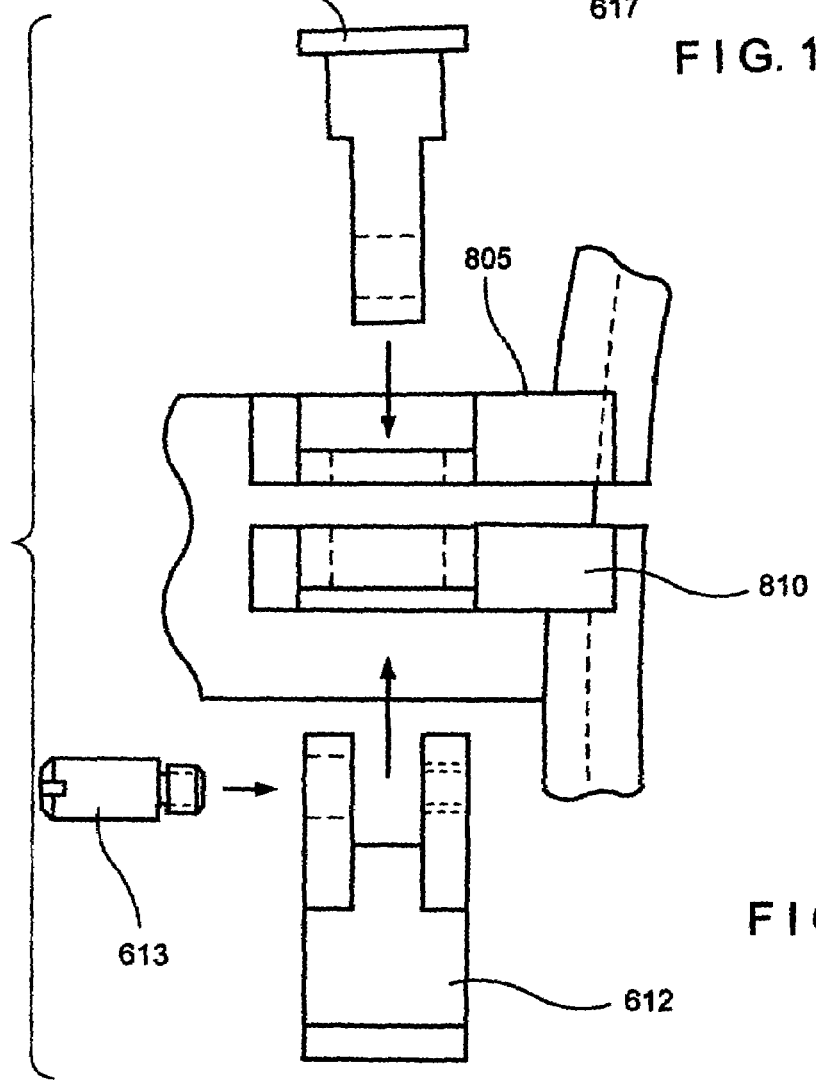
FIG. 11 is an exploded view of the latching mechanism of the frame.

FIG. 8 shows a portion of the frame in the open position. FIG. 9 shows the cam arm 612 rotating from the open position (solid lines) toward the closed position (dotted lines). FIG. 10 is a top view of the hinge pin. FIG. 11 is an exploded view showing the mechanism for the present invention.

While presently preferred embodiments have been described for purposes of the disclosure, numerous changes in the arrangement of method steps and apparatus parts can be made by those skilled in the art. Such changes are encompassed within the spirit of the invention as defined by the appended claims.

The invention claimed is:

1. An eyeglass frame having lenses and a lower eyewire closure block and an upper eyewire closure block comprising a cam mechanism including a cam lock formed of a pair of cam heads connected to an arm of said cam lock, a hinge pin extending through a hole in a closure block of said frame, said pair of cam heads being pivotally connected to said hinge pin and to said lower eyewire closure block by a pivot point so that when said cam arm is moved in a first direction to a first position, said cam heads rotate away from said lower eyewire closure block and cause said lower eyewire closure block and said upper eyewire closure block to separate a distance thereby opening said frame eyewire for a lens to be removed, inserted or replaced; and said arm being moved to a second position opposite said first position which cause said cam heads to rotate back into engagement against said lower eyewire closure block thereby causing said lower eyewire closure block to come together with said upper eyewire closure block and said frame to close, the improvement comprising:

said cam arm including a rounded or wave-shaped portion adapted to be fitted on top of or within a recess in said upper eyewire closure block of said frame to provide for a more secure closure of said frame while making allowance for said lenses being slightly over cut and to prevent accidental opening of said frame.

2. The frame according to claim 1 wherein said cam arm is made from a suitable elastic material to enable said frame to lock securely even if said lens is over-cut and to provide clamping force to keep the upper and lower eyewire closure blocks pressed together.

3. The frame according to claim 2 wherein said suitable elastic material is spring steel.

4. The frame according to claim 1 wherein said frame further includes a non-threaded hinge pin to insure proper alignment of said cam arm and a groove cut into said upper and lower eyewire closure blocks.

* * * * *